(12) United States Patent
Sun

(10) Patent No.: US 11,467,661 B2
(45) Date of Patent: Oct. 11, 2022

(54) GAZE-POINT DETERMINING METHOD, CONTRAST ADJUSTING METHOD, AND CONTRAST ADJUSTING APPARATUS, VIRTUAL REALITY DEVICE AND STORAGE MEDIUM

(71) Applicant: Beijing BOE Technology Development Co., Ltd., Beijing (CN)

(72) Inventor: Gaoming Sun, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 599 days.

(21) Appl. No.: 16/335,952

(22) PCT Filed: Sep. 19, 2018

(86) PCT No.: PCT/CN2018/106516
§ 371 (c)(1),
(2) Date: Mar. 22, 2019

(87) PCT Pub. No.: WO2019/137038
PCT Pub. Date: Jul. 18, 2019

(65) Prior Publication Data
US 2021/0341998 A1    Nov. 4, 2021

(30) Foreign Application Priority Data
Jan. 12, 2018 (CN) .......................... 201810032553.3

(51) Int. Cl.
*G06F 3/01*       (2006.01)
*G06T 19/00*    (2011.01)
(Continued)

(52) U.S. Cl.
CPC ............ *G06F 3/013* (2013.01); *G06T 19/006* (2013.01); *G06V 10/141* (2022.01); *G06V 40/193* (2022.01)

(58) Field of Classification Search
CPC .... G06F 3/013; G06K 9/0061; G06K 9/2027; G06K 9/00604; G06T 19/006; G06T 7/20; A61B 3/113; G06V 10/141; G06V 40/193
(Continued)

(56) References Cited

U.S. PATENT DOCUMENTS

2006/0147094 A1* 7/2006 Yoo .................... G06K 9/00604
                                                                              382/117
2008/0111833 A1    5/2008 Thorn et al.
(Continued)

FOREIGN PATENT DOCUMENTS

CN          101576771 A      11/2009
CN          101964111 A       2/2011
(Continued)

OTHER PUBLICATIONS

International Search Report and Written Opinion dated Nov. 16, 2018 from State Intellectual Property Office of the P.R. China
(Continued)

*Primary Examiner* — Abdul-Samad A Adediran
(74) *Attorney, Agent, or Firm* — Dilworth & Barrese, LLP.; Michael J. Musella, Esq.

(57) ABSTRACT

A gaze-point determining method, a contrast adjusting method and a contrast adjusting apparatus for a virtual reality device, a virtual reality device and a storage medium. The contrast adjusting method includes: determining a coordinate of a gaze point in a display region viewed by a user;
(Continued)

determining a gaze region of the user based on the coordinate of the gaze point; and adjusting brightness of the gaze region.

15 Claims, 5 Drawing Sheets

(51) Int. Cl.
    *G06V 10/141*     (2022.01)
    *G06V 40/18*     (2022.01)

(58) Field of Classification Search
    USPC .......................... 345/156; 351/210; 382/117
    See application file for complete search history.

(56) References Cited

U.S. PATENT DOCUMENTS

| | | | |
|---|---|---|---|
| 2013/0050070 A1* | 2/2013 | Lewis | G06K 9/00604 |
| | | | 345/156 |
| 2013/0114043 A1* | 5/2013 | Balan | A61B 3/113 |
| | | | 351/210 |
| 2017/0206862 A1 | 7/2017 | Jha et al. | |
| 2018/0032133 A1* | 2/2018 | Cho | G06F 3/013 |
| 2019/0121427 A1* | 4/2019 | Qin | G06F 3/013 |
| 2019/0138092 A1* | 5/2019 | Song | G06T 7/20 |

FOREIGN PATENT DOCUMENTS

| | | |
|---|---|---|
| CN | 102830797 A | 12/2012 |
| CN | 104133548 A | 11/2014 |
| CN | 104484043 A | 4/2015 |

OTHER PUBLICATIONS

Extended European Search Report from European Patent Application No. 18857405.7 dated Sep. 7, 2021.

Blignaut et al., "The effect of Mapping Function on the Accuracy of a Video-Based Eye Tracker", Proceedings of Eye Tracking South Africa, Aug. 29, 2013, pp. 39-46.

Zou et al., "New 2D Pupil and Spot Center Positioning Technology Under Real—Time Eye Tracking", 12 International Conference on Computer Science & Education, Aug. 22, 2017, pp. 110-115, University of Houston.

* cited by examiner

GAZE-POINT DETERMINING METHOD, CONTRAST ADJUSTING METHOD, AND CONTRAST ADJUSTING APPARATUS, VIRTUAL REALITY DEVICE AND STORAGE MEDIUM

The present application claims priority to Chinese Patent Application No. 201810032553.3 filed on Jan. 12, 2018, the disclosure of which is incorporated herein by reference in its entirety as part of the present application.

TECHNICAL FIELD

Embodiments of the present disclosure relate to a gaze-point determining method, a contrast adjusting method and a contrast adjusting apparatus for a virtual reality device, a virtual reality device and a storage medium.

BACKGROUND

Along with the continuous development of electronic science and technology, Virtual Reality (VR) or Augmented Reality (AR) technology, as a kind of high and new technology, has been increasingly applied in daily life. Virtual reality technology is also called as immersive technology or artificial environment.

Existing virtual reality systems mainly simulate a virtual, three-dimensional world with the aid of a high-performance computing system with a central processor, and provide the users with visual, auditory and other sensory experience, thus making the users feel as if they are personally on the scene. Moreover, the man-machine interaction can also be carried out.

SUMMARY

At least one embodiment of the present disclosure provides a gaze-point determining method, which comprises,
acquiring a center position coordinate of a pupil of a user, and
determining a coordinate of a gaze point in a display region viewed by the user by means of mapping, based on the center position coordinate of the pupil.

For example, in the gaze-point determining method according to an embodiment of the present disclosure, the coordinate of the gaze point is obtained by following expressions:

$$\begin{cases} X_G = a_0 + a_1 \cdot x + a_2 \cdot y + a_3 \cdot x \cdot y + a_4 \cdot x^2 + a_5 \cdot y^2 + a_6 \cdot x^2 \cdot y^2 \\ Y_G = b_0 + b_1 \cdot x + b_2 \cdot y + b_3 \cdot x \cdot y + b_4 \cdot x^2 + b_5 \cdot y^2 + b_6 \cdot x^2 \cdot y^2 \end{cases}$$

where $X_G$ and $Y_G$ are horizontal and vertical coordinates of the gaze point, respectively, x and y are horizontal and vertical coordinates of the center position of the pupil, respectively, and $a_0$ to $a_6$ and $b_0$ to $b_6$ are mapping parameters.

For example, in the gaze-point determining method according to an embodiment of the present disclosure, the mapping parameters are determined based on a coordinate of a preset calibration point in the display region and a plurality of pre-acquired coordinates of center positions of the pupil.

For example, in the gaze-point determining method according to an embodiment of the present disclosure, the acquiring the center position coordinate of the pupil of the user comprises:

obtaining image information of an eyeball of the user and a periphery of the eyeball;
performing feature extraction on the image information to obtain an image of the pupil of the user; and
determining a center position coordinate of the image of the pupil of the user.

At least one embodiment of the present disclosure further provides a contrast adjusting method for a virtual reality device, which comprises:

determining a coordinate of a gaze point in a display region viewed by a user through the gaze-point determining method according to an embodiment of the present disclosure;
determining a gaze region of the user based on the coordinate of the gaze point; and
adjusting brightness of the gaze region.

For example, in the contrast adjusting method according to an embodiment of the present disclosure, the gaze region of the user is determined to be a region which is centered on the gaze point and a length and width of which are in a range of 15% to 45% of a length and width of the display region viewed by the user, respectively.

For example, in the contrast adjusting method according to an embodiment of the present disclosure, the display region viewed by the user further comprises a non-gaze region located outside the gaze region, and the brightness adjustment further comprises adjusting brightness of the non-gaze region.

For example, in the contrast adjusting method according to an embodiment of the present disclosure, the brightness of the non-gaze region is adjusted based on a distance from the non-gaze region to the gaze region.

For example, in the contrast adjusting method according to an embodiment of the present disclosure, the adjusting brightness of the gaze region is a brightness increasing operation, and the brightness increasing operation comprises:

detecting an average brightness value of the display region viewed by the user and an average brightness value corresponding to a predetermined power consumption; and
increasing the brightness of the gaze region, in a case where the average brightness value of the display region viewed by the user is less than the average brightness value corresponding to the predetermined power consumption.

For example, in the contrast adjusting method according to an embodiment of the present disclosure, the brightness increasing operation further comprises: reducing the brightness of the non-gaze region, in a case where the average brightness value of the display region viewed by the user is greater than or equal to the average brightness value corresponding to the predetermined power consumption.

For example, in the contrast adjusting method according to an embodiment of the present disclosure, the increasing the brightness of the gaze region comprises multiplying a pixel value of the gaze region by an average brightness ratio;
the reducing the brightness of the non-gaze region comprises: multiplying a pixel value of the non-gaze region by the average brightness ratio,
the average brightness ratio is expressed as follows:

$$L = \frac{Ave2}{Ave1}$$

where L denotes the average brightness ratio, Ave1 denotes the average brightness value of the display region viewed by the user, and Ave2 denotes the average brightness value corresponding to the predetermined power consumption.

At least one embodiment of the present disclosure further provides a contrast adjusting apparatus, which comprises:
a processor;
a memory;
one or more computer program modules, stored in the memory and configured to be executed by the processor, and comprising instructions for implementing the contrast adjusting method according to an embodiment of the present disclosure.

At least one embodiment of the present disclosure further provides a contrast adjusting apparatus, comprising a gaze region obtaining unit and a brightness adjustment unit, wherein,
the gaze region obtaining unit is configured to determine a coordinate of a gaze point in a display region viewed by a user according to a center position coordinate of a pupil of a user, and to determine a gaze region of the user according to the coordinate of the gaze point; and
the brightness adjustment unit is configured to adjust brightness of the gaze region.

For example, in the contrast adjusting apparatus according to an embodiment of the present disclosure, the display region viewed by the user further comprises a non-gaze region located outside the gaze region, and the brightness adjustment unit is further configured to adjust brightness of the non-gaze region.

For example, in the contrast adjusting apparatus according to an embodiment of the present disclosure, the brightness adjustment unit comprises a brightness increasing sub-unit configured to increase the brightness of the gaze region in a case where an average brightness value of an display region viewed by the user is less than an average brightness value corresponding to a predetermined power consumption, or to reduce the brightness of the non-gaze region in a case where the average brightness value of the display region viewed by the user is greater than or equal to the average brightness value corresponding to the predetermined power consumption.

For example, in the contrast adjusting apparatus according to an embodiment of the present disclosure, the gaze region obtaining unit further comprises:
a center position coordinate obtaining sub-unit, configured to obtain the center position coordinate of the pupil of the user; and a gaze point coordinate obtaining sub-unit, configured to determine the coordinate of the gaze point in the display region viewed by the user by means of mapping, according to the center position coordinate of the pupil.

For example, the contrast adjusting apparatus according to an embodiment of the present disclosure further comprises a pupil center position obtaining unit, wherein the pupil center position obtaining unit is configured to: obtain image information of an eyeball of the user and a periphery of the eyeball, perform feature extraction on the image information to obtain an image of the pupil of the user, and determine a center position coordinate of the image of the pupil of the user.

At least one embodiment of the present disclosure further provides a virtual reality device, comprising the contrast adjusting apparatus according to an embodiment of the present disclosure.

For example, the virtual reality device according to an embodiment of the present disclosure further comprises an image acquisition apparatus, wherein the image acquisition apparatus is configured to obtain an image of the pupil of the user.

At least one embodiment of the present disclosure further provides a storage medium, storing computer-readable instructions non-temporarily, which when executed by a computer, execute the gaze-point determining method according to an embodiment of the present disclosure or the contrast adjusting method according to an embodiment of the present disclosure.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
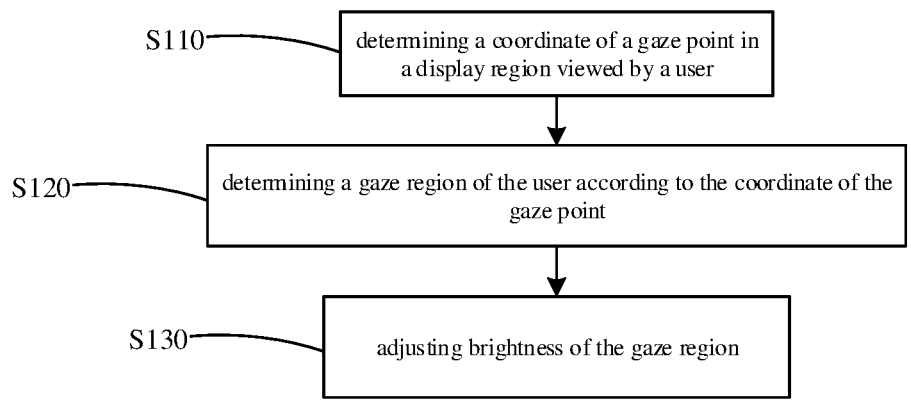
FIG. 1 is a flowchart of a contrast adjusting method for a virtual reality device provided by an embodiment of the present disclosure.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Hereinafter, various embodiments according to the present disclosure will be described in detail with reference to the accompanying drawings. It should be noted that in the drawings, the same reference numerals are given to components which basically have the same or similar structure and function, and the repeated description thereof will be omitted.

In the virtual reality technology, an organic light emitting diode (OLED) display apparatus is generally adopted as the display panel. Therefore, in order to reduce the power consumption of a virtual reality device, it may be achieved by reducing the brightness of the screen of the OLED display apparatus. However, reducing the brightness of the entire display region of the display apparatus will cause the image displayed in the display region to be unclear, affecting the using effect and users' experience. Accordingly, although the power consumption of the virtual reality device can be reduced in this manner, it seriously affects the display quality of OLED, and thus has an impact on the visual feeling of users.

According to at least an embodiment of the present disclosure, there is provided a gaze-point determining method. The gaze-point determining method includes: acquiring a center position coordinate of a pupil of a user; and determining by mapping a coordinate of a gaze point in a display region viewed by the user, based on the center position coordinate of the pupil.

According to at least an embodiment of the present disclosure, there is further provided a contrast adjusting method for a virtual reality device. The contrast adjusting method includes: determining a coordinate of a gaze point in a display region viewed by a user, and determining a gaze region of the user based on the coordinate of the gaze point; and adjusting brightness of the gaze region.

According to at least an embodiment of the present disclosure, there are further provided a contrast adjusting apparatus corresponding to the above contrast adjusting method, a virtual reality device and a storage medium.

Regarding the gaze-point determining method, the contrast adjusting method for a virtual reality device, the contrast adjusting apparatus, the virtual reality device and the storage medium that are provided by at least an embodiment of the present disclosure, on one hand, the accuracy of determining a gaze point in a display region may be improved by the gaze-point determining method, and for example, the error rate of determining the gaze point may be made to be less than 1.5°; on the other hand, the user's gaze region may be determined according to a center position coordinate of the user's pupil, and by means of adjusting the brightness of the gaze region and a non-gaze region, the brightness of the gaze region of the virtual reality device is increased. Thus, the contrast of the display region of the virtual reality device is improved. Consequently, the power consumption of the virtual reality device is reduced on the premise of ensuring display quality.

Thereinafter, embodiments of the present disclosure will be described in detail in conjunction with the attached drawings.

FIG. 1 is a flowchart of a contrast adjusting method for a virtual reality device provided by an embodiment of the present disclosure. For example, the contrast adjusting method may be implemented at least in part by means of software, which is loaded and executed by a processor in the virtual reality device, or implemented at least in part by hardware, firmware, etc., so as to improve the contrast of a display region of the virtual reality device, and to reduce the power consumption of the virtual reality device on the premise of ensuring the display quality.

As illustrated in FIG. 1, the contrast adjusting method provided by the embodiment includes steps S110 to S130, and the steps S110 to S130 of the contrast adjusting method and their respective exemplary implementations will be introduced below, respectively.

Step S110: determining a coordinate of a gaze point in a display region viewed by a user.

For example, the coordinate of the gaze point in the display area viewed by the user may be determined by a gaze-point determining method based on a center position coordinate of a pupil. The gaze-point determining method will be introduced in detail in an example shown in FIG. 3, for example by a mapping function, details of which are omitted here. For example, the determination of the coordinate of the gaze point may also be achieved by a central processing unit (CPU) or a processing unit in another form with a data processing capability and/or an instruction executing capability. For example, the processing unit may be a general-purpose processor or a dedicated processor, and it may be a processor based on the X86 or ARM architecture, etc.

Step S120: determining a gaze region of the user according to the coordinate of the gaze point.

Figure 2:
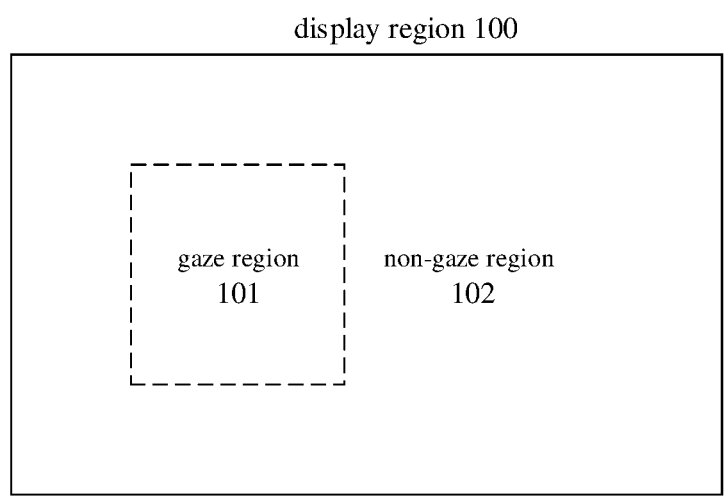
FIG. 2 is a schematic view showing a gaze region and a non-gaze region of a user in the contrast adjusting method shown in FIG. 1.

For example, FIG. 2 is a schematic view of a gaze region 101 and a non-gaze region 102 of the user. The user's gaze region 101 is a region within a certain distance from the gaze point. For example, as shown in FIG. 2, the user's gaze region 101 includes such a region that it is centered on the gaze point, and its length and width are about in the range of 15% to 45% of the length and width of a display region viewed by the user, respectively, for example, 30% of the length and width of the display region viewed by the user. For example, as shown in FIG. 2, the display region further includes a non-gaze region 102 located outside the gaze region 101. For example, the gaze region 101 may change as the center position coordinate of the pupil changes.

It is to be noted that, the gaze region 101 is not limited to the shape shown in FIG. 2. For example, when the gaze regions of two eyes overlap, the gaze region may be the superposition of two gaze regions, and for example, a gaze region in a '∞' shape is obtained.

For example, the determination of the gaze region 101 may be achieved by a gaze region obtaining unit, which may be implemented by means of software, firmware, hardware, etc. For example, when at least part of the gaze region obtaining unit uses a software module, the determination may be implemented by a central processing unit (CPU) or a processing unit in other forms with a data processing capability and/or an instruction execution capability executing the software module.

According to the gaze region adjusting method of the present embodiment, the position of a gaze region is allowed to change unceasingly following the rotation of the eyeball, and thereby the continuous adjustment of the gaze region is realized, and even more the real-time adjustment is realized. Furthermore, the gaze region adjustment method of the present embodiment is applicable to different usage situations of different users.

Step S130: adjusting brightness of the gaze region.

For example, adjusting the brightness of the gaze region may include adjusting the brightness of the gaze region 101 and the brightness of the non-gaze region 102. For example, adjusting the brightness of the gaze region 101 includes increasing the brightness of the gaze region. For example, adjusting the brightness of the non-gaze region 102 includes reducing the brightness of the non-gaze region. For example, the brightness level of the non-gaze region may be adjusted according to the distance from the non-gaze region to the gaze region, and for example, the brightness may vary gradually. For example, the brightness of the non-gaze region 102 gradually decreases with the gaze region as a center, namely, the brightness of a portion closer to the gaze region 101 is higher than that of a portion farther away from the gaze region 101 in the non-gaze region 102. For example, the adjustment of the brightness of the gaze region may be achieved by a brightness adjustment unit. Likewise, the brightness adjustment unit may be implemented in software, firmware, hardware, etc.

It could be noted that, in the embodiments of the present disclosure, the contrast adjusting method may include more or less operations, and these operations may be executed sequentially or in parallel. The embodiments of the present disclosure do not place limitation on this aspect.

With the method of adjusting the brightness of the gaze region provided by the present embodiment, not only the contrast of the display region is improved, but also the power consumption of the display panel may be reduced to a certain extent.

It should be noted that: the above operations S110-S130 can all be performed by the machine instead of being performing manually, thereby improving the automaticity.

Figure 3:
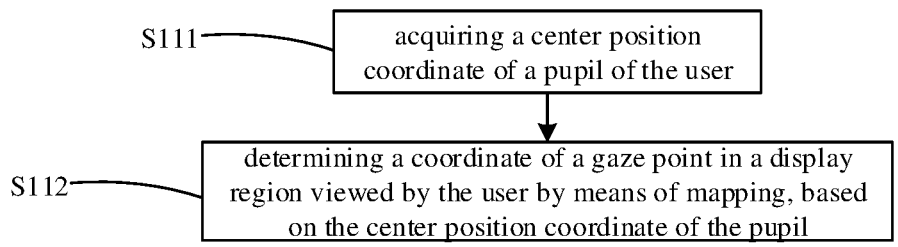
FIG. 3 is a flowchart of a gaze-point determining method in the contrast adjusting method shown in FIG. 1.

FIG. 3 is a flowchart of a gaze-point determining method in a contrast adjusting method provided by an embodiment of the present disclosure. That is, FIG. 3 is an operational flowchart of an example of step S110 shown in FIG. 1. It is to be noted that, the gaze-point determining method may be used in the above contrast adjusting method, or may be separately applied, independently from the above contrast adjusting method.

As illustrated in FIG. 3, the gaze-point determining method provided by the embodiment includes step S111 to step S112.

Step S111: acquiring a center position coordinate of a pupil of the user.

For example, the center position coordinate of the pupil may be the position coordinate of an image center of the user's pupil in an acquired image. For example, the acquired image may be the image information of an eyeball and the periphery of the eyeball, or may be a human face image, etc., and the embodiments of the present disclosure do not place limitation on this aspect. For example, the image of the user's pupil may be obtained by means of conducting feature extraction and classification training on the acquired image (e.g., captured image information of an eyeball and the periphery of the eyeball).

Figure 5:
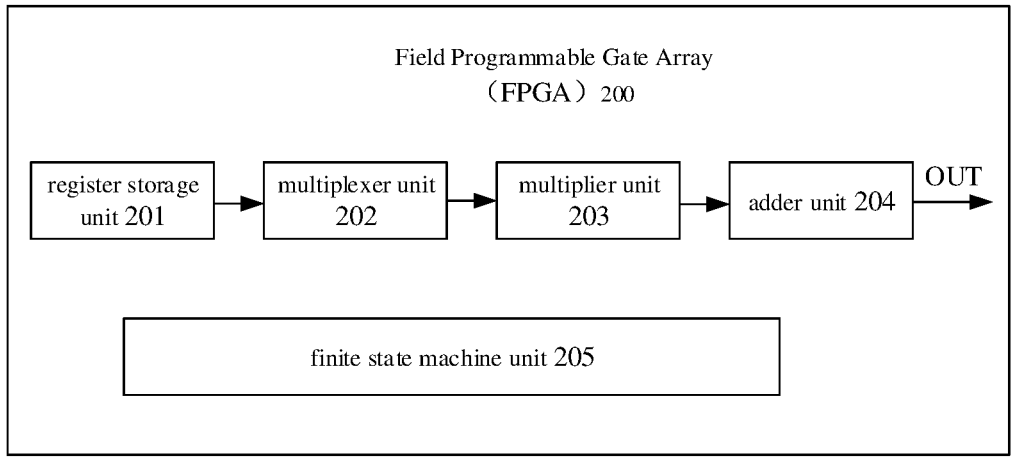
FIG. 5 is a block diagram of an implementation of determining by mapping a coordinate of a gaze point in a display region viewed by a user shown in FIG. 3.

For example, the center position coordinate of the pupil may be stored in a register storage unit 201 of a Field Programmable Gate Array (FPGA) 200 shown in FIG. 5, and may be called by the FPGA as required. The specific operation procedure will be introduced in detail below, and is not elaborated here.

For example, the extraction of feature points of the pupil may be achieved by a Scale-invariant Feature Transform (SIFT) feature extraction algorithm, a Histogram of Oriented Gradient (HOG) feature extraction algorithm and other conventional algorithm in this field. The embodiments of the present disclosure do not place limitation on this aspect.

For example, a large number of (for example, 10000 or more) images including pupil may be gathered as a sample library beforehand, and feature extraction may be performed on the images in the sample library. Next, with the use of images in the sample library and extracted feature points, a classification model is trained and tested by machine learning (such as depth learning, or a regression algorithm based on local features) or other algorithms, so as to obtain the classification model for the user's pupil image. For example, the classification model may also be achieved by other conventional algorithms (e.g. Support Vector Machine, SVM) in this field, and the embodiments of the present disclosure do not place limitation on this aspect. It could be noted that, the machine learning algorithm may be achieved by conventional methods in this field, and it is not elaborated here. For example, an input of the classification model is an acquired image, and an output of the classification model is an image of the user's pupil.

For example, after the pupil's image is obtained, a center position of the pupil's image may be extracted by a gravity method. For example, it is also possible to determine the contour of the pupil and to obtain feature points of the pupil's image by a Canny edge detection algorithm, a Hough transform fitting method, a double ellipse fitting algorithm, etc., and the fitted contour of pupil is verified, so as to determine a center position coordinate of the pupil. For example, the origin of the coordinate system of the pupil's center position coordinate may be arranged at an upper-left corner of an image acquired by an image acquisition apparatus.

For example, the acquired image may represent an original image that is acquired directly by the image acquisition apparatus, and may also be an image that is obtained after pre-processing of an original image. The image acquisition apparatus may include, for example, a CMOS (complementary metal oxide semiconductor) sensor, a CCD (charge coupled device) sensor, an infrared camera, or the like. For example, the image acquisition apparatus may be set in the plane where an OLED display panel is located, for example, on a frame of a VR device. For example, before step S111, the gaze-point determining method provided by an embodiment of the present disclosure may further include an operation in which an image acquired by an image acquisition apparatus is preprocessed in favor of the detection of the user's pupil to obtain a center position coordinate of the user's pupil. Irrelevant information or noise information in an original image can be eliminated by the image pre-processing operation, so as to carry out a pupil detection of the acquired image better. For example, the image preprocessing operation may include performing image scaling, compression or format conversion, color gamut conversion, gamma correction, image enhancement, de-noising filtering or other treatment on the acquired image. For example, in the above method for determining the center position coordinate of pupil, determination may be done by a pupil center position obtaining unit, or by a central processing unit (CPU), an image processor (GPU) or a processing unit in other forms with a data processing capability and/or an instruction execution capability. Likewise, the pupil center position obtaining unit may be implemented by way of software, firmware, hardware, and so on as well as any combination thereof. For example, the method for obtaining a center position coordinate of the pupil's image will be introduced in detail in an example shown in FIG. 6, and is not elaborated here.

Step S112: determining a coordinate of a gaze point in a display region viewed by the user by means of mapping, based on the center position coordinate of the pupil.

For example, in an example, the mapping relationship between the coordinate of the gaze point in the display region viewed by the user and the coordinate of a center position of pupil could be expressed as the following expressions:

$$\begin{cases} X_G = a_0 + a_1 \cdot x + a_2 \cdot y + a_3 \cdot x \cdot y + a_4 \cdot x^2 + a_5 \cdot y^2 + a_6 \cdot x^2 \cdot y^2 \\ Y_G = b_0 + b_1 \cdot x + b_2 \cdot y + b_3 \cdot x \cdot y + b_4 \cdot x^2 + b_5 \cdot y^2 + b_6 \cdot x^2 \cdot y^2 \end{cases}$$

where $X_G$ and $Y_G$ are horizontal and vertical coordinates of the gaze point, respectively, x and y are horizontal and vertical coordinates of the center position of the pupil, and $a_0$ to $a_6$ and $b_0$ to $b_6$ are mapping parameters.

For example, the above expressions may be implemented by multipliers and adders, and mapping parameters in the expressions may be determined based on coordinates of preset gaze-point calibration points in the display region and pre-acquired corresponding coordinates of numerous center positions of the pupil. The particular calculating process may be achieved by the FPGA 200 shown in FIG. 5, which will be introduced in detail below, and is not elaborated here. It should be noted that, the gaze-point coordinate may also be achieved by a dedicated gaze-point coordinate calculating unit, and may be achieved by a central processing unit (CPU), an image processor (GPU) or a processing unit in other forms having a data processing capability and/or an instruction execution capability as well, and the embodiments of the present disclosure do not place limitation on this aspect. For example, the gaze-point coordinate calculating unit may be implemented by means of software, firmware, hardware, or any combination thereof.

For example, the pre-acquired coordinates of numerous center positions of the pupil may be obtained according to the coordinates of preset calibration points.

Figure 4:
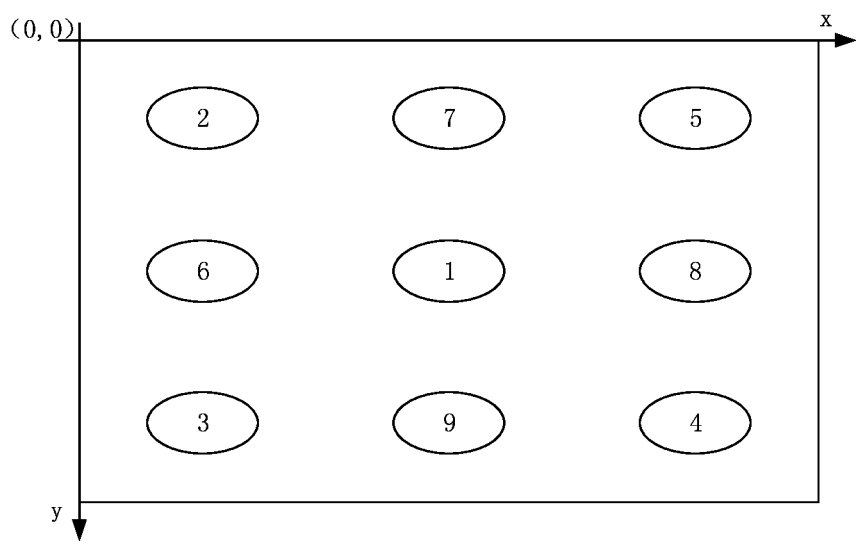
FIG. 4 is a schematic view showing coordinates of preset calibration points in the gaze-point determining method shown in FIG. 3.

For example, in a particular example, FIG. 4 shows the positions of nine preset calibration points in the display region. For example, as shown in FIG. 4, the origin of the coordinate system for the coordinates of the preset calibration points may be arranged at an upper-left corner of the display region of the virtual reality device, but the embodiments of the present disclosure are not limited thereto. For example, the coordinates of the preset calibration points may be represented as:

($X_1$, $Y_1$)=(830, 440)
($X_2$, $Y_2$)=(570, 350)
($X_3$, $Y_3$)=(570, 570)
($X_4$, $Y_4$)=(1200, 570)
($X_5$, $Y_5$)=(1200, 350)
($X_6$, $Y_6$)=(570, 440)
($X_7$, $Y_7$)=(830, 350)
($X_8$, $Y_8$)=(1200, 440)
($X_9$, $Y_9$)=(830, 570)

where ($X_1$, $Y_1$) to ($X_9$, $Y_9$) represent coordinates of the first to ninth preset calibration points in the display region shown in FIG. 4.

For example, when the user looks attentively at the nine preset calibration points, respectively, the corresponding pupil coordinates that are extracted may be represented as:

($x_1$, $y_1$)=(382.404, 296.579)
($x_2$, $y_2$)=(450.586, 283.600)
($x_3$, $y_3$)=(412.539, 302.071)
($x_4$, $y_4$)=(352.949, 313.447)
($x_5$, $y_5$)=(353.391, 285.008)
($x_6$, $y_6$)=(410.668, 296.006)
($x_7$, $y_7$)=(355.052, 283.001)
($x_8$, $y_8$)=(355.777, 298.334)
($x_9$, $y_9$)=(386.885, 306.631)

where ($x_1$, $y_1$) to ($x_9$, $y_9$) represent center position coordinates of the pupil corresponding to the preset first to ninth calibration points in the display region shown in FIG. 4. For example, ($x_1$, $y_1$) is the center position coordinate of the pupil obtained when the user looks attentively at the first calibration point coordinate ($X_1$, $Y_1$). It should be noted that, different center position coordinates ($x_1$, $y_1$) to ($x_9$, $y_9$) of the pupil may be obtained for different users. For example, when a user looks attentively at the above calibration points in sequence, center position coordinates of the pupil corresponding to the nine calibration points may be obtained in sequence by a pupil center position obtaining unit according to the method in step S111. For example, the origin of the coordinate system for the pupil's center position coordinates may be set at an upper-left corner of an image acquired by an image acquisition apparatus. For example, the image acquired by the image acquisition apparatus includes the image information of an eyeball and the periphery of the eyeball, but the embodiments of the present disclosure are not limited thereto.

For example, the above ($X_1$, $Y_1$), ($x_1$, $y_1$) to ($X_9$, $Y_9$), ($x_9$, $y_9$) may be input into the above expressions, respectively, to obtain values of $a_0$ to $a_6$ and $b_0$ to $b_6$. For example, nine or more expressions concerning the mapping parameters may be obtained by setting nine or more calibration point coordinates, and thus the calculation result of the mapping parameters may be more accurate.

It should be noted that, the embodiments of the present disclosure are not limited thereto, and the number of calibration points may also be set to be seven, eight, ten, etc., as long as the values of the mapping parameters $a_0$ to $a_6$ and $b_0$ to $b_6$ can be obtained from the above expressions.

For example, coordinates of the preset calibration points may be obtained by measurement or calculation before the calculation of a gaze point, and for example, coordinates of calibration points may be obtained by measurement and calculation before OLED display panels leave the factory, and may also be obtained by measurement and calculation after OLED display panels leave the factory. For example, coordinates of calibration points may be stored in a memory of an OLED display panel, and the OLED display panel may read the coordinates from the memory when required. The memory may include one or more computer program products, and the one or more computer program products may include computer readable storage media in various forms, such as volatile memories and/or non-volatile memories, and such as magnetic storage media, semiconductor storage media, etc.

For example, in an example, the above method of mapping the coordinate of the gaze point may be achieved by a Field Programmable Gate Array (FPGA) 200 shown in FIG. 5. In this embodiment, as shown in FIG. 5, the FPGA includes a register storage unit 201, a multiplexer unit 202, a multiplier unit 203, an adder unit 204 and a finite state machine unit 205. For example, the register storage unit 201 controls the reception and transmission of data; the multiplexer unit 202 acts as a data channel to filter the data; and the multiplier unit 203 and the adder unit 204 perform multiplication and addition operations of the filtered data. For example, each unit cannot work alone, and multiplication and addition operations in the mapping formula are achieved jointly by the register storage unit 201, the multiplexer unit 202, the multiplier unit 203 and the adder unit 204 implement under the control of the finite state machine unit 205.

For example, the particular realization process of the mapping formula (i.e., calculating the coordinate of the gaze-point) may include: firstly, after mapping parameters $a_0$ to $a_6$ and $b_0$ to $b_6$ are obtained in step S112, they are input into the register storage unit 201 for caching, and after a center position coordinate (x, y) of the pupil is obtained by step S111, the center position coordinate (x, y) of the pupil and other data are also input to the register storage unit 201 for caching; next, the data stored in the register storage unit 201 (e.g. the center position coordinate of the pupil) are filtered by using the multiplexer unit 202; finally, under the control of the finite state machine unit 205, the multiplier unit 203 and the adder unit 204 call the center position coordinate of the pupil and corresponding mapping parameters that are cached in the register storage unit 201, and thus multiplicative and accumulative operations in the above expressions are realized, so as to obtain the coordinate $(X_G, Y_G)$ of the gaze point.

It should be noted that, the embodiments of this disclosure are not limited to the above-mentioned manner, and the calculation of the gaze-point coordinate may also be done by other methods capable of realizing the mapping formula.

With the gaze-point determining method in the present embodiment, the accuracy of the determination of the gaze point in the display region may be improved, and for example, the error rate of the determination of the gaze point may be less than 1.5°.

Figure 6:
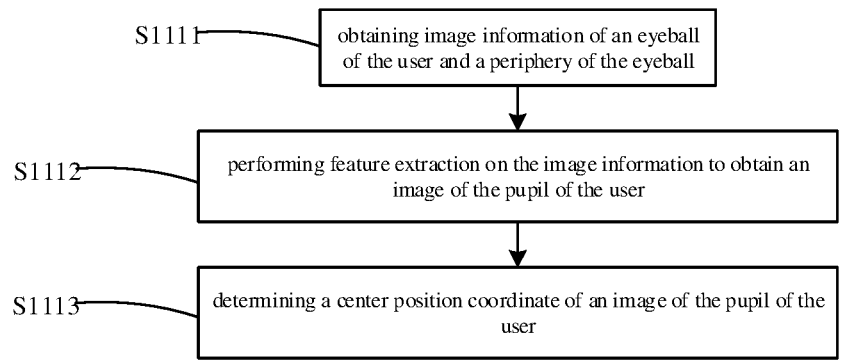
FIG. 6 is a flowchart of determining a center position coordinate of pupil in the gaze-point determining method shown in FIG. 3.

FIG. 6 is a flowchart of determining a center position coordinate of the pupil in a gaze-point determining method provided by an embodiment of the present disclosure. That is, FIG. 6 is an operational flowchart of an example of the step S111 shown in FIG. 3.

As shown in FIG. 6, the process of determining the center position coordinate of pupil includes steps S1111 to S1113.

Step S1111: obtaining image information of an eyeball of the user and a periphery of the eyeball.

For example, an image acquisition apparatus including a CMOS (complementary metal oxide semiconductor) sensor, a CCD (charge coupled device) sensor, an infrared camera head, or the like may be used for obtaining the image information of the eyeball of the user and the periphery of the user. For example, the image acquisition apparatus may be set in the plane where an OLED display panel is located, for example, on a frame of a VR device.

Step S1112: performing feature extraction on the image information to obtain an image of the pupil of the user.

For example, the acquired image information may be binarized to be converted into a gray-scale image, and feature extraction is performed on the image information. For example, the Harr method, the HOG feature extraction algorithm and other methods capable of realizing feature extraction may be used for feature extraction of the image information. For example, extracted feature maps may be classified by a well-trained classifier, so as to obtain the image information belonging to the pupil. For example, the classifier may adopt a support vector machine (SVM), a neural network (such as a type-2 fuzzy neural network) or other means, but the embodiments of the present disclosure are not limited to specific models and methods. For example, in a plurality of feature maps derived from the classifier that fall within the pupil, there may be included a plurality of communicating domains. For example, the plurality of communicating domains may be processed by way of dilation and erosion, and be subjected to image denoising by means of comparative optimization and selecting appropriate threshold values. For example, the pupil's image may be determined based on the information of a selected communicating domain with the largest area. For example, obtaining an image of the pupil may be achieved by a central processing unit (CPU) or a processing unit in another form having data processing capabilities and/or instruction execution capabilities.

Step S1113: determining a center position coordinate of an image of the pupil of the user.

For example, the center point of the image of the pupil may be extracted by the gravity method. For example, it is also possible to determine the contour of the pupil and to obtain feature points of the pupil's image by a Canny edge detection algorithm, a Hough transform fitting method, a double ellipse fitting algorithm, etc., and the fitted contour of pupil is verified, so as to determine a center position coordinate of pupil. For example, the center position coordinate may be determined by a pupil center position obtaining unit. Likewise, the pupil center position obtaining unit may be implemented by way of software, firmware, hardware, etc.

Figure 7:
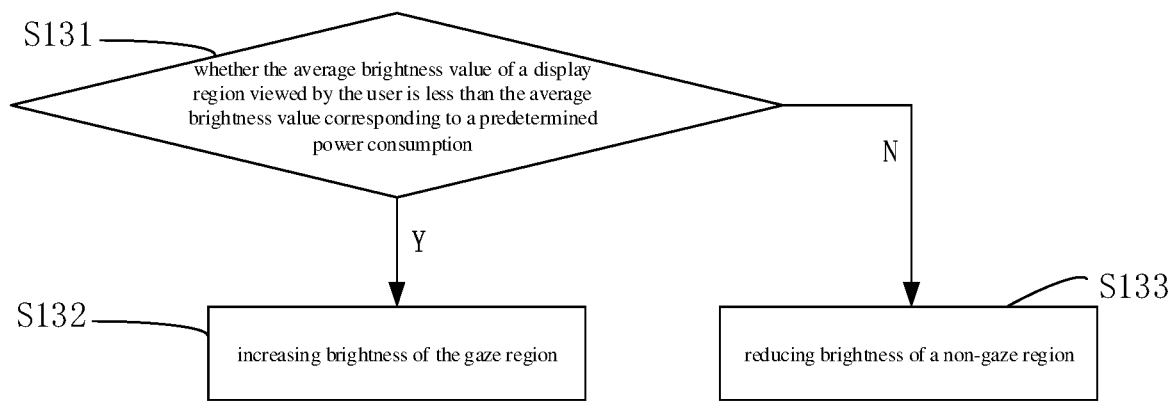
FIG. 7 is a flowchart of adjusting a brightness of the gaze region in the contrast adjusting method shown in FIG. 1.

FIG. 7 is a flowchart of adjusting the brightness of a gaze region in a contrast adjusting method provided by an embodiment of the present disclosure. That is, FIG. 7 is an operational flowchart of an example of the step S130 shown in FIG. 1.

As shown in FIG. 7, the brightness adjusting process of the gaze region includes steps S131 to S133.

Step S131: detecting whether the average brightness value of a display region viewed by the user is less than the average brightness value corresponding to a predetermined power consumption, if yes, performing step S132; if no, performing step S133.

For example, the average brightness value corresponding to the predetermined power consumption may be expressed as an average brightness value corresponding to a power consumption of 1W. For example, the average brightness value corresponding to the predetermined power consumption may be obtained by measurement or calculation according to a corresponding relationship between brightness and power consumption prior to adjusting the brightness, and for example, the average brightness value corresponding to the predetermined power consumption may be obtained by measurement and calculation before OLED display panels leave the factory, or after OLED display panels leave the factory. For example, the average brightness value corresponding to the predetermined power consumption may be stored in a memory of an OLED display panel, and the OLED display panel can read it from the memory when required. The memory may include one or more computer program products, and the one or more computer program products may include computer readable storage media in various forms, such as volatile memories and/or non-volatile memories. For example, the average brightness value of the display region may be obtained by collecting statistics on a histogram of an image displayed in the display region. For example, this step may be performed in a brightness adjustment unit. Likewise, the brightness adjustment unit may be implemented by software, firmware, hardware, etc.

Step S132: increasing brightness of the gaze region.

For example, increasing brightness of the gaze region 101 includes multiplying pixel values of the gaze region 101 by an average brightness ratio, respectively. For example, the average brightness ratio is expressed as:

$$L = \frac{Ave2}{Ave1}$$

where L denotes the average brightness ratio, Ave1 denotes the average brightness value of the display region viewed by the user, and Ave2 denotes the average brightness value corresponding to the predetermined power consumption.

For example, the average brightness ratio may be stored in a memory for an OLED panel.

Step S133: reducing brightness of a non-gaze region.

For example, reducing the brightness of the non-gaze region 102 includes multiplying pixel values of the non-gaze region 102 by the average brightness ratio L, respectively. In different examples, the pixel values may be pixel data values that are obtained after the picture data or image data acquired by the display apparatus are decoded, and may also be pixel data values resultant from performing a further corresponding Gamma transformation for a display panel, and the embodiments of the present disclosure do not place limitation on this aspect. The pixel values respectively multiplied by the average brightness ratio L are finally input to the display panel for display, so as to achieve a display effect of reducing the brightness of the non-gaze region.

In the brightness adjusting method provided by an embodiment of the present disclosure, for example, by means of judging whether the power consumption of displaying an image in the current display region exceeds 1 W (e.g. the result is obtained by comparing corresponding brightness values), a gaze region and a non-gaze region are separately adjusted.

For example, if power consumption of currently displaying the image is less than 1 W, that is, the average brightness value Ave1 of a display region viewed by the user is less than the average brightness value Ave2 corresponding to the predetermined power consumption, it indicates that, although power consumption of displaying the image is not high, the overall brightness of the image is at a relatively low level. In this case, contrast may be improved by increasing the brightness of the gaze region, thereby promoting the impression of viewing. For example, the scale factor of the increasement is the average brightness ratio L, while leaving the brightness value of the non-gaze region unchanged. In this way, it may be ensured that the power consumption of the entire image is close to 1 W but not more than 1 W.

For example, if the power consumption of currently displaying the image is greater than 1 W, which indicates that the power consumption is relatively high, in order not to reduce the brightness of the gaze region, the power consumption of displaying the image may be reduced by reducing the brightness of the non-gaze region. For example, the scale factor of the reduction is the average brightness ratio L.

The calculation procedure of the increasement/reduction scale factor may be carried out dynamically in this embodiment, and it may be ensured that the phenomenon of screen flashing will not occur during the display of an image.

Therefore, with the brightness adjusting method, adaptive adjustment of the brightness is carried out by comprehensively considering the contrast of a display region, the brightness value of a gaze region and the power consumption of currently displaying the image, so as to reduce the power consumption of the display device, and to increase the contrast of the display region.

It should be noted that, in the embodiments of the present disclosure, the process of the contrast adjusting method for the virtual reality may include more or less operations, and these operations may be executed sequentially or in parallel. Although the process of the training method described above includes numerous operations occurring in a particular order, it should be understood that the sequence of these operations is not limited thereto. The contrast adjusting method described above may be performed once, and may also be performed multiple times according to predetermined conditions.

With the contrast adjusting method provided by an embodiment of the present disclosure, a gaze region of the user may be determined according to a center position coordinate of the pupil of the user, and the brightness of gaze region of a virtual reality device may be increased by adjusting the brightness of the gaze region and a non-gaze region. Thereby, the contrast of a display region of the virtual reality device may be improved. Consequently, the power consumption of the virtual reality device is reduced on the premise of ensuring display quality.

Figure 8:
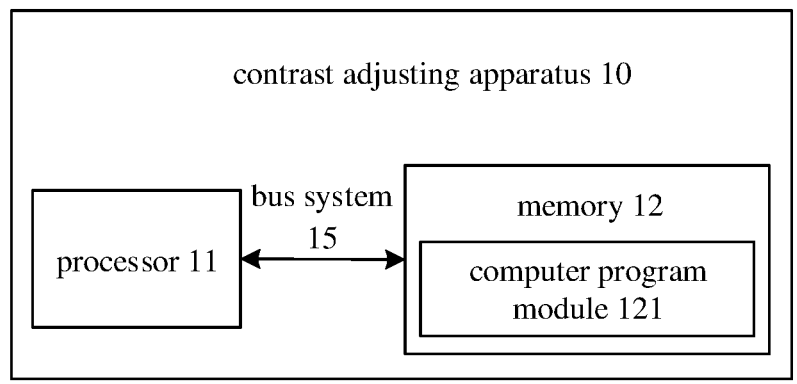
FIG. 8 is a schematic diagram of a contrast adjusting apparatus for a virtual reality device provided by an embodiment of the present disclosure.

FIG. 8 is a schematic block diagram of a contrast adjusting apparatus 10 provided by an embodiment of the present disclosure. For example, as shown in FIG. 8, the contrast adjusting apparatus 10 may include a processor 11, a memory 12, and one or more computer program modules 121. For example, the processor 11 is connected to the memory 12 via a bus system 15. For example, the one or more computer program modules may be stored in the memory 12. For example, the one or more computer program modules 121 may include instructions for implementing the above contrast adjusting method. For example, instructions in the one or more computer program modules 121 may be executed by the processor 11. For example, the bus system 15 may be a commonly used serial or parallel communication bus, etc., and the embodiments of the present disclosure do not place limitation on this aspect. It should be noted that components and structures of the contrast adjusting apparatus 10 shown in FIG. 8 are merely illustrative, rather than limiting, and according to the requirements, the contrast adjusting apparatus 10 may have other components and structures as well.

Regarding technical effects of the contrast adjusting apparatus 10, reference may be made to the technical effects of the contrast adjusting method provided by an embodiment of this disclosure, the details of which are omitted here.

Figure 9:
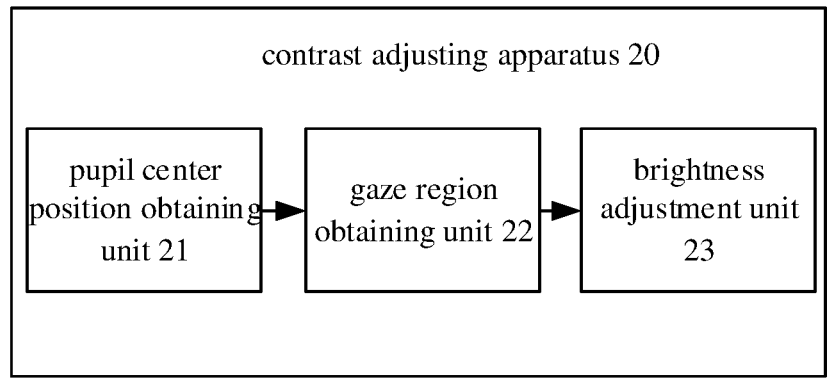
FIG. 9 is a schematic diagram of another contrast adjusting apparatus for a virtual reality device provided by an embodiment of the present disclosure.

FIG. 9 is a schematic block diagram of another contrast adjusting apparatus 20 provided by an embodiment of the present disclosure. The contrast adjusting method disclosed above may be performed by the contrast adjusting apparatus 20. Since details of each operation in the contrast adjusting apparatus 20 are basically the same as those of the contrast adjusting method described above with reference to FIGS. 1 to 7, for the sake of avoiding repetition, description of the same details is omitted while the contrast adjusting apparatus 20 is described below.

For example, as shown in FIG. 9, the contrast adjusting apparatus 20 includes a pupil center position obtaining unit 21, a gaze region obtaining unit 22 and a brightness adjustment unit 23. As mentioned above, these units may be implemented by way of software, firmware, hardware or any combination thereof.

For example, the pupil center position obtaining unit 21 is configured to obtain image information of the eyeball of the user and the periphery of the eyeball, and to perform feature extraction on the image information, so as to obtain an image of the pupil of the user, and to determine a center position coordinate of the image of the pupil of the user. For example, the pupil center position obtaining unit 21 may perform steps S1111 to S1113 shown in FIG. 6 for determining the center position coordinate of the pupil. For example, obtaining the image information of the eyeball of the user and the periphery of the eyeball may be achieved by an image acquisition apparatus, such as a CMOS sensor, a CCD sensor, an infrared camera or the like, and the acquired image information may be stored in storage.

For example, the gaze region obtaining unit 22 is configured to determine the coordinate of a gaze point in a display region viewed by the user based on the center position coordinate of the pupil obtained by the pupil center position obtaining unit 21, and to determine a gaze region 101 of the user based on the coordinate of the gaze point. For example, the gaze region obtaining unit 22 may be used to implement step S110 and step S120 in the contrast adjusting method shown in FIG. 1.

For example, the gaze region obtaining unit 22 includes a center position coordinate obtaining sub-unit and a gaze point coordinate obtaining sub-unit (not shown in the figure). For example, the center position coordinate obtaining sub-unit is configured to obtain a center position coordinate of the user's pupil. For example, the gaze point coordinate obtaining sub-unit is configured to determine the coordinate of the gaze point in the display region viewed by the user by way of mapping according to the center position coordinate of the pupil.

For example, the brightness adjustment unit 23 is configured to adjust the brightness of the gaze region 101. For example, the brightness adjustment unit 23 may perform the step for adjusting the brightness of the gaze region shown in FIG. 7.

For example, the display region viewed by the user further includes a non-gaze region 102 located outside the gaze region, and the brightness adjustment unit 23 is further configured to adjust the brightness of the non-gaze region 102.

For example, the brightness adjustment unit 23 may include a brightness increasing sub-unit (not shown in the figure), and is configured to increase the brightness of the gaze region 101, if the average brightness value of the display region viewed by the user is less than an average brightness value corresponding to a predetermined power consumption; or to reduce the brightness of the non-gaze region 102, if the average brightness value of the display region viewed by the user is greater than or equal to an average brightness value corresponding to a predetermined power consumption.

It should be noted that, in the embodiments of this disclosure, more or fewer circuits may be included, and the connection relationship between the individual circuits is not limited, and may be determined according to actual requirements. The particular forming manner of each circuit is limited, it may be by analog devices based on the principle of the circuits, and may also be formed by digital chips, or, it may be formed in other applicable manner.

Regarding the technical effects of the contrast adjusting apparatus 20, reference may be made to the technical effects of the contrast adjusting method provided by an embodiment of this disclosure, the details of which are omitted here.

Figure 10:
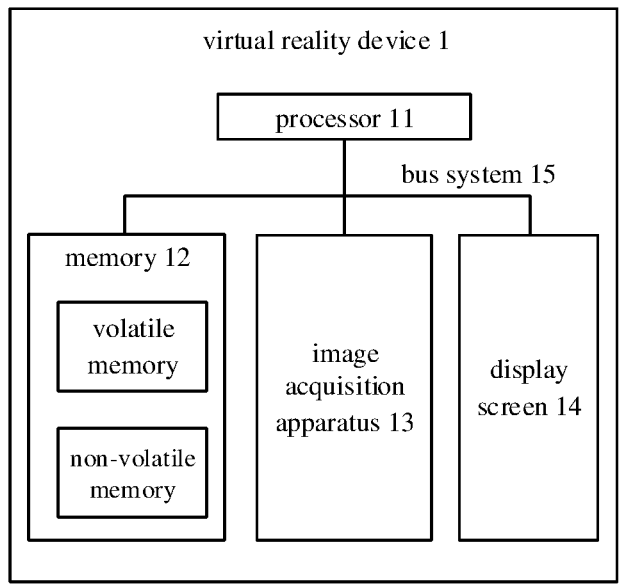
FIG. 10 is a schematic diagram of a virtual reality device provided by another embodiment of the present disclosure.

According to an embodiment of the present disclosure, there is further provided a virtual reality device 1. The virtual reality device 1 includes the contrast adjusting apparatus provided by any embodiment of the present disclosure. For example, the contrast adjusting apparatus 10 shown in FIG. 8 or the contrast adjusting apparatus 20 shown in FIG. 9 is included. FIG. 10 is a schematic block diagram of a virtual reality device provided by an embodiment of this disclosure. For example, as shown in FIG. 10, the virtual reality device 1 includes a processor 11, a memory 12, an image acquisition apparatus 13, and a display screen 14.

For example, the image acquisition apparatus 13 may be configured to obtain an image of the pupil of the user. For example, the image acquisition apparatus 13 may include a CMOS image sensor, a CCD image sensor, or an infrared camera, and for example, it may be arranged in the plane where the display screen is located, such as, on a frame of virtual reality device. For example, the image acquisition apparatus 13 may perform feature extraction and classification on the acquired image information, so as to obtain an image of the pupil of the user. For example, the image acquisition apparatus 13 may further include an image processing unit, so as to perform a dilation and erosion treatment on the acquired image of the pupil, and for example, it may be implemented by software, firmware, hardware, etc.

For example, the display screen 14 may be an OLED display panel, a micro-LED display panel, a silicon-based liquid crystal (LCOS) display panel, etc.

For example, these components are interconnected by a bus system 15 and/or a coupling mechanism in another form (not shown). For example, the bus system 15 may be a commonly used serial or parallel communication bus, and the embodiments of the present disclosure do not place limitation on this aspect. It should be noted that, components and structures of the virtual reality device 1 shown in FIG. 10 are merely illustrative, rather than limiting, and according to the requirements, the virtual reality device 1 may have other components and structures as well.

For example, the processor 11 may be a central processing unit (CPU) or a processing unit in another form having a data processing capability and/or an instruction execution capability, and may be a general-purpose processor or a dedicated processor. And, the processor 11 may control other components in the virtual reality device 1 so as to perform expected functions. The memory 12 may include one or more computer program products, which may include computer readable storage media in various forms, such as volatile memories and/or non-volatile memories. The volatile memories may, for example, include random access memories (RAM) and/or cache memories (caches), etc. The non-volatile memories may, for example, include read-only memories (ROMs), hard disks, flash memories, etc. One or more computer program instructions may be stored on the computer readable storage media, and the processor 11 may execute the program instructions, so as to realize the stated functions (achieved by the processor 11) in embodiments of the present disclosure and/or other expected functions, such as, the brightness adjustment operation, the gaze point determination method, the determination of the center position coordinate of the pupil, etc. In the computer-readable storage media, there may be also stored a variety of application programs and various data, such as, coordinates of preset calibration points, various data used and/or generated by the application programs, etc.

Regarding technical effects of the virtual reality device 1, reference may be made to the technical effects of the contrast adjusting method provided by an embodiment of this disclosure, the details of which are omitted here.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units, modules or steps involved in the embodiments of the present application may be implemented by way of software, hardware, firmware, or any combination thereof. The described units or modules may also be provided in a processor, and the names of these units or modules are not considered as a limitation to the units or modules.

According to an embodiment of the present disclosure, there is further provided a storage medium. For example, the storage medium stores computer-readable instructions non-temporarily, and when the non-temporary computer readable instructions are executed by a computer, the gaze-point determining method provided by any embodiment of the present disclosure or the contrast adjusting method provided by any embodiment of the present disclosure may be executed.

For example, the storage medium may be any combination of one or more computer-readable storage media, and for example, one computer-readable storage medium contains computer-readable program codes for the brightness enhancement operation, and another computer-readable storage medium contains computer-readable program codes for the gaze-point calculation operation. For example, when the program codes are read by a computer, the computer may execute the program codes stored in the computer storage medium, so as to perform operations such as the brightness adjustment operation, the gaze-point determining method, the determination of the center position coordinate of pupil, and other operational method, provided by any of the embodiments of the present disclosure.

For example, the storage medium may include a memory card for a smart phone, a storage unit for a tablet computer, a hard disk for a personal computer, a random access memory (RAM), a read-only memory (ROM), an erasable, programmable read-only memory (EPROM), a portable compact-disk read-only memory (CD-ROM), a flash memory, or any combination of the above storage media, and may also be another applicable storage medium.

The following statements should be noted:
(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

What is claimed is:

1. A gaze-point determining method, comprising,
acquiring a center position coordinate of a pupil of a user; and
determining a coordinate of a gaze point in a display region viewed by the user by means of mapping, based on the center position coordinate of the pupil,
wherein the coordinate of the gaze point is obtained by following expressions:

$$\begin{cases} X_G = a_0 + a_1 \cdot x + a_2 \cdot y + a_3 \cdot x \cdot y + a_4 \cdot x^2 + a_5 \cdot y^2 + a_6 \cdot x^2 \cdot y^2 \\ Y_G = b_0 + b_1 \cdot x + b_2 \cdot y + b_3 \cdot x \cdot y + b_4 \cdot x^2 + b_5 \cdot y^2 + b_6 \cdot x^2 \cdot y^2 \end{cases}$$

where $X_G$ is a horizontal coordinate of the gaze point and $Y_G$ is a vertical coordinate of the gaze point, x is a horizontal coordinate of the center position of the pupil and y is a vertical coordinate of the center position of the pupil, and $a_0$ to $a_6$ and $b_0$ to $b_6$ are mapping parameters.

2. The gaze-point determining method according to claim 1, wherein the mapping parameters are determined based on a coordinate of a preset calibration point in the display region and a plurality of pre-acquired coordinates of center positions of the pupil.

3. The gaze-point determining method according to claim 1, wherein the acquiring the center position coordinate of the pupil of the user comprises:
obtaining image information of an eyeball of the user and image information of a periphery of the eyeball;
extracting a feature of the image information of the eyeball of the user and a feature of the image information of the periphery of the eyeball to obtain an image of the pupil of the user; and
determining a center position coordinate of the image of the pupil of the user.

4. A storage medium, non-temporarily storing computer-readable instructions, which when executed by a computer, execute the gaze-point determining method according to claim 1.

5. A contrast adjusting method for a virtual reality device, comprising:
determining a coordinate of a gaze point in a display region viewed by a user through a gaze-point determining method, wherein the gaze-point determining method comprises:
acquiring a center position coordinate of a pupil of a user; and determining a coordinate of a gaze point in a display region viewed by the user by means of mapping, based on the center position coordinate of the pupil;
determining a gaze region of the user based on the coordinate of the gaze point, wherein the display region viewed by the user further comprises a non-gaze region located outside the gaze region; and adjusting brightness of the gaze region and brightness of the non-gaze region, to make the brightness of the gaze region different from the brightness of the non-gaze region;

wherein the gaze region of the user is determined to be a region, the region is centered on the gaze point, a length of the region is in a range of 15% to 45% of a length of the display region viewed by the user and a width of the region is in a range of 15% to 45% of a width of the display region viewed by the user.

6. The contrast adjusting method according to claim 5, wherein the brightness of the non-gaze region is adjusted based on a distance from the non-gaze region to the gaze region.

7. The contrast adjusting method according to claim 5, wherein the adjusting brightness of the gaze region is a brightness increasing operation, and the brightness increasing operation comprises:

detecting an average brightness value of the display region viewed by the user and an average brightness value corresponding to a predetermined power consumption; and increasing the brightness of the gaze region, in a case where the average brightness value of the display region viewed by the user is less than the average brightness value corresponding to the predetermined power consumption.

8. The contrast adjusting method according to claim 7, wherein the brightness increasing operation further comprises:

reducing the brightness of the non-gaze region, in a case where the average brightness value of the display region viewed by the user is greater than or equal to the average brightness value corresponding to the predetermined power consumption.

9. The contrast adjusting method according to claim 8, wherein, the increasing the brightness of the gaze region comprises: multiplying a pixel value of the gaze region by an average brightness ratio;

the reducing the brightness of the non-gaze region comprises: multiplying a pixel value of the non-gaze region by the average brightness ratio, the average brightness ratio is expressed as follows:

$$L = \frac{Ave2}{Ave1}$$

where L denotes the average brightness ratio, Ave1 denotes the average brightness value of the display region viewed by the user, and Ave2 denotes the average brightness value corresponding to the predetermined power consumption.

10. A contrast adjusting apparatus, comprising a gaze region obtaining unit and a brightness adjustment unit, wherein, the gaze region obtaining unit is configured to determine a coordinate of a gaze point in a display region viewed by a user according to a center position coordinate of a pupil of a user, and to determine a gaze region of the user according to the coordinate of the gaze point, wherein the display region viewed by the user further comprises a non-gaze region located outside the gaze region; and the brightness adjustment unit is configured to adjust brightness of the gaze region and brightness of the non-gaze region, to make the brightness of the gaze region different from the brightness of the non-gaze region;

wherein the gaze region of the user is determined to be a region, the region is centered on the gaze point, a length of the region is in a range of 15% to 45% of a length of the display region viewed by the user and a width of the region is in a range of 15% to 45% of a width of the display region viewed by the user.

11. The contrast adjusting apparatus according to claim 10, wherein the brightness adjustment unit comprises a brightness increasing sub-unit configured to increase the brightness of the gaze region in a case where an average brightness value of an display region viewed by the user is less than an average brightness value corresponding to a predetermined power consumption, or to reduce the brightness of the non-gaze region in a case where the average brightness value of the display region viewed by the user is greater than or equal to the average brightness value corresponding to the predetermined power consumption.

12. The contrast adjusting apparatus according to claim 10, wherein the gaze region obtaining unit further comprises:

a center position coordinate obtaining sub-unit, configured to obtain the center position coordinate of the pupil of the user; and a gaze point coordinate obtaining sub-unit, configured to determine the coordinate of the gaze point in the display region viewed by the user by means of mapping, according to the center position coordinate of the pupil.

13. The contrast adjusting apparatus according to claim 12, further comprising a pupil center position obtaining unit, wherein the pupil center position obtaining unit is configured to: obtain image information of an eyeball of the user and image information of a periphery of the eyeball, extract a feature of the image information of the eyeball of the user and a feature of the image information of the periphery of the eyeball to obtain an image of the pupil of the user; and determine a center position coordinate of the image of the pupil of the user.

14. A virtual reality device, comprising the contrast adjusting apparatus according to claim 10.

15. The virtual reality device according to claim 14, further comprising an image acquisition apparatus, wherein the image acquisition apparatus is configured to obtain an image of the pupil of the user.

* * * * *